(12) United States Patent
Byun

(10) Patent No.: US 12,112,046 B2
(45) Date of Patent: Oct. 8, 2024

(54) MEMORY SYSTEM AND OPERATION METHOD THEREOF

(71) Applicant: SK hynix Inc., Gyeonggi-do (KR)

(72) Inventor: Eujoon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/313,372

(22) Filed: May 8, 2023

(65) Prior Publication Data

US 2023/0350577 A1   Nov. 2, 2023

Related U.S. Application Data

(62) Division of application No. 16/922,583, filed on Jul. 7, 2020, now Pat. No. 11,687,249.

(30) Foreign Application Priority Data

Dec. 17, 2019 (KR) .................. 10-2019-0168632

(51) Int. Cl.
  *G06F 11/10*  (2006.01)
  *G06F 3/06*  (2006.01)
  *G06F 11/30*  (2006.01)

(52) U.S. Cl.
  CPC .......... *G06F 3/0619* (2013.01); *G06F 3/0611* (2013.01); *G06F 3/064* (2013.01); *G06F 3/0656* (2013.01); *G06F 3/0659* (2013.01); *G06F 3/0679* (2013.01); *G06F 11/1068* (2013.01); *G06F 11/3037* (2013.01)

(58) Field of Classification Search
  CPC ............ G06F 11/1068; G06F 11/1072; G06F 11/1008; G06F 11/08; G06F 3/0619; G06F 3/0656; G06F 3/0679
  See application file for complete search history.

(56) References Cited

U.S. PATENT DOCUMENTS

| | | | | |
|---|---|---|---|---|
| 10,599,333 B2* | 3/2020 | Hashimoto | ........... | G06F 3/0679 |
| 10,733,110 B1* | 8/2020 | Volpe | .................... | G06F 3/0656 |
| 10,854,290 B1* | 12/2020 | Wu | ...................... | G11C 11/5628 |
| 2015/0193302 A1* | 7/2015 | Hyun | ................... | G11C 29/028 |
| | | | | 714/764 |
| 2017/0024137 A1* | 1/2017 | Kanno | .................. | G06F 3/0679 |
| 2018/0032275 A1* | 2/2018 | Pahwa | ................ | G11C 11/5628 |

\* cited by examiner

*Primary Examiner* — Yolanda L Wilson
(74) *Attorney, Agent, or Firm* — IP & T GROUP LLP

(57) ABSTRACT

A memory system may include a nonvolatile memory device comprising a first area and a second area having a higher data I/O operation speed than the first area, and a controller suitable for performing a first read operation on hot data having a hot property, among data stored in the first area. The controller may control the nonvolatile memory device to copy the hot data into the second area during the first read operation, and access the hot data copied in the second area, when a second read operation on the hot data is requested after the first read operation.

10 Claims, 14 Drawing Sheets

FIG. 10B

STEP A

| LBA | PBA | | RD CNT | |
| --- | --- | --- | --- | --- |
|  | FAST AREA | SLOW AREA |  |  |
| 1 | 10 | 98 | 17 | HOT |
| 2 | 11 | 102 | 9 | HOT |
| 3 | 13 |  | 5 | HOT |
| 4 |  | 74 | 4 | COLD |
| 5 | 15 | 78 | 10 | HOT |

STEP B

| LBA | PBA | | RD CNT | |
| --- | --- | --- | --- | --- |
|  | FAST AREA | SLOW AREA |  |  |
| 1 | 10 | 98 | 17 | HOT |
| 2 | 11 | 102 | 9 | HOT |
| 3 | 13 | 56 | 5 | HOT |
| 4 |  | 74 | 5 | HOT |
| 5 | 15 | 78 | 10 | HOT |

STEP C

| LBA | PBA | | RD CNT | |
| --- | --- | --- | --- | --- |
|  | FAST AREA | SLOW AREA |  |  |
| 1 | 10 | 98 | 17 | HOT |
| 2 | 11 | 102 | 9 | HOT |
| 3 |  | 56 | 5 | HOT |
| 4 | 17 | 74 | 5 | HOT |
| 5 | 15 | 78 | 10 | HOT |

MEMORY SYSTEM AND OPERATION METHOD THEREOF

CROSS-REFERENCE TO RELATED APPLICATION

This application is a division of U.S. patent application Ser. No. 16/922,583 filed on Jul. 7, 2020, which claims priority under 35 U.S.C. § 119 to Korean Patent Application No. 10-2019-0168632 filed on Dec. 17, 2019, which is incorporated herein by reference in its entirety.

BACKGROUND

1. Field

Various embodiments of the present invention relate to a memory system and an operation method thereof. More particularly, various embodiments of the present invention relate to a memory system capable of increasing the operation efficiency of a memory device, and an operation method thereof.

2. Discussion of the Related Art

Recently, the paradigm for a computing environment has shifted to ubiquitous computing, which enables computer systems to be accessed virtually anytime and everywhere. As a result, the use of portable electronic devices, such as mobile phones, digital cameras, notebook computers and the like, is rapidly increasing. Such portable electronic devices typically use or include a memory system that employs at least one memory device for storing data, i.e., a data storage device. The data storage device can be used as a main storage device or an auxiliary storage device of a portable electronic device.

Unlike a hard disk, a data storage device using a nonvolatile semiconductor memory device is advantageous in that it has excellent stability and durability because it has no mechanical driving part (e.g., a mechanical arm), and has high data access speed and low power consumption. In the context of a memory system having such advantages, its data storage device may be implemented by a USB (Universal Serial Bus) memory device, a memory card having any of various interfaces, a solid-state drive (SSD) or the like.

SUMMARY

Various embodiments of the present invention are directed to a memory system which can output read data from a fast mode area having a higher read operation speed than a slow mode area, during a read operation. This way the memory system can achieve a reduced read operation time. Various embodiments of the present invention also relate to an operation method of the memory system.

Also, various embodiments of the present invention are directed to a memory system which can distribute read operations, which can be performed only in a slow mode area, to a fast mode area, and prevent degradation in the characteristics of memory cells included in the slow mode area, and an operation method thereof.

Also, various embodiments of the present invention are directed to a memory system which can prevent a situation in which error correction operation for read data to be transmitted to a host is unsuccessful and unsuccessful, by performing error correction operation on data stored in a slow mode area, when an error of data stored in a fast mode area is out of a correction range, thereby increasing the reliability of read data, and an operation method thereof.

According to an embodiment of the present invention, a memory system comprising: a nonvolatile memory device including a first area and a second area, A data I/O operation speed of the second area may be higher than a data I/O operation speed of the first area; and a controller suitable for: performing a first read operation on hot data having a hot property among data stored in the first area, controlling the nonvolatile memory device to copy the hot data into the second area during the first read operation, and accessing the hot data copied in the second area when a second read operation on the hot data may be requested after the first read operation.

The controller may be further suitable for: performing an error correction operation on the copied hot data and transmitting the corrected hot data to the host during the second read operation.

The controller may be further suitable for accessing the hot data in the first area during the second read operation when an error on the copied hot data may be not corrected through the error correction operation.

The nonvolatile memory device may further comprise a buffer suitable for temporarily storing data read from the first and second areas, before transferring the read data to the controller, and The controller controls the nonvolatile memory device to copy the hot data, which may be read from the first area and temporarily stored in the buffer, into the second area during the first read operation.

The controller may be further suitable for: generating, deleting or correcting map information for translating a logical address into a physical address, and associating the hot property, which may be determined based on a data access frequency, with the map information.

The first area may comprise a memory block constituted by nonvolatile memory cells each capable of storing multi-bit data therein, and the second area may comprise a memory block constituted by nonvolatile memory cells each capable of storing 1-bit data therein.

The data I/O operation speed indicates the speed of an operation of programming data to the nonvolatile memory cells included in the first and second areas, or reading the programmed data.

According to an embodiment of the present invention, an operation method of a memory system which may include a nonvolatile memory device including a first area and a second area having a higher data I/O operation speed than the first area, the operation method comprising: performing a first read operation on hot data having a hot property among data stored in the first area; copying the hot data into the second area during the first read operation; and accessing the hot data copied in the second area when a second read operation for the hot data may be requested after the first read operation.

The operation method may further comprise: performing an error correction operation on the copied hot data during the second read operation, and transmitting the corrected hot data to the host. The operation method may further comprise accessing, when an error may be not corrected through the error correction operation on the copied hot data, the hot data in the first area during the second read operation.

The copying may include copying the hot data, which may be read from the first area and temporarily stored in a buffer, into the second area during the first read operation. The operation method may further comprise: generating, deleting or correcting map information for translating a logical address into a physical address, and associating the hot property, which may be determined based on a data access frequency, with the map information.

The first area may comprise a memory block constituted by nonvolatile memory cells each capable of storing multi-bit data therein, and the second area may comprise a memory block constituted by nonvolatile memory cells each capable of storing 1-bit data therein.

The data I/O operation speed indicates the speed of an operation of programming data to the nonvolatile memory cells included in the first and second areas, or reading the programmed data.

According to an embodiment of the present invention, a an operation method of a memory system, comprising: determining an access mode of an area in which data corresponding to a logical address may be stored, when a read request with the logical address may be received from a host; performing an error correction operation to data from a first area when the data may be stored in the first area having a first access mode and a second area having a second access mode; and determining whether an error of the data from the first area may be successfully corrected and transmitting the error-corrected data to the host when the error of the data from the first area may be successfully corrected.

The operation method may further comprise; performing an error correction operation to data from the second area when the error of the data from the first area may be not successfully corrected; and transmitting the error-corrected data from the second area to the host.

The operation method, may further comprise: determining a storage area of hot data, before the read request may be received; and copying the hot data, stored in the second area, into the first area through a first copy operation when the hot data may be stored only in the second area.

The operation method may further comprise copying the hot data, stored in the first area, into the second area through a second copy operation when the hot data may be stored only in the first area.

The first copy operation may comprise: reading out the hot data stored in the second area, and storing the read data in a page buffer; and programming the hot data stored in the page buffer to the first area.

The second copy operation may comprise: reading out the hot data stored in the first area, and storing the read data in a page buffer; performing an error correction operation on the hot data stored in the page buffer; and programming the hot data, on which the error correction operation has been performed, to the second area.

A background operation performed on the first area may comprise a first copy operation of copying valid data stored in the first area into another memory block having the first access mode.

A background operation performed on the second area may comprise a second copy operation of copying valid data stored in the second area into another memory block having the second access mode.

The speed of a read operation and a program operation of the data stored in the first area may be higher than the speed of a read operation and a program operation of the data stored in the second area.

A number of state values of data which may be storable in a memory cell included in the first area may be less than a number of state values of data which may be storable in a memory cell included in the second area.

When the first access mode may be a Single-Level Cell (SLC) mode, the second access mode may comprise any one of a Multi-Level Cell (MLC) mode, a Triple-Level Cell (TLC) mode and a Quadruple-Level Cell (QLC) mode, The first access mode may be an MLC mode, the second access mode may comprise any one mode of the TLC mode and the QLC mode, or when the first access mode may be the TLC mode, the second access mode may comprise the QLC mode.

According to an embodiment of the present invention, a an operation method of a memory system, comprising: a memory system comprising: a memory device including a first region of higher-level cells and a second region of lower-level cells, the first and second regions respectively storing first and second data; and a controller suitable for controlling the memory device to: copy the first data into the second region without error-correcting the first data, copy the second data into the first region while error-correcting the second data, perform, in response to a read request for any of the first and second data, a read operation on the second region, and perform, when the read operation fails, an additional read operation on the first region.

According to an embodiment of the present invention, a an operation method of a memory system, comprising: a memory system comprising: a memory device including a first region of higher-level cells and a second region of lower-level cells, the first and second regions storing data; and a controller suitable for controlling the memory device to: perform, in response to a read request for the data, a read operation on the second region, and perform, when the read operation fails, an additional read operation on the first region.

The effects of the memory system and the operation method thereof in accordance with the present embodiments will be described as follows.

The memory system and the operation method thereof can output read data from the fast mode area where the read operation speed is higher than the slow mode area, during a read operation, and thus reduce the time required for the read operation. Thus, the copy operation efficiency of the memory system can be improved.

The memory system and the operation method thereof can distribute read operations, which can be performed only in the slow mode area, to the fast mode area, and prevent degradation in characteristics of memory cells, included in the slow mode area, by the read operations. Thus, the reliability of data stored in the memory system can be improved.

The memory system and the operation method thereof can perform error correction operation on data stored in the slow mode area, when an error of data stored in the fast mode area is out of a correction range, and thus avoid a situation in which error correction operation for read data to be transmitted to a host is unsuccessful. Thus, it is possible to provide a memory system capable of increasing the reliability of read data, and an operation method thereof.

These and other features and advantages of the present invention will become better understood from the following drawings and detailed description.

BRIEF DESCRIPTION OF THE DRAWINGS

FIGS. 10A and 10B illustrate performing a copy operation by the memory system according to an updated read count in accordance with an embodiment of the present invention.

DETAILED DESCRIPTION

Hereafter, various embodiments will be described in detail with reference to the accompanying drawings. It should be understood that the following descriptions will be focused on portions required for understanding an operation in accordance with an embodiment, and descriptions of the other portions may be omitted in order not to unnecessarily obscure the subject matter of the present disclosure.

Figure 1A:
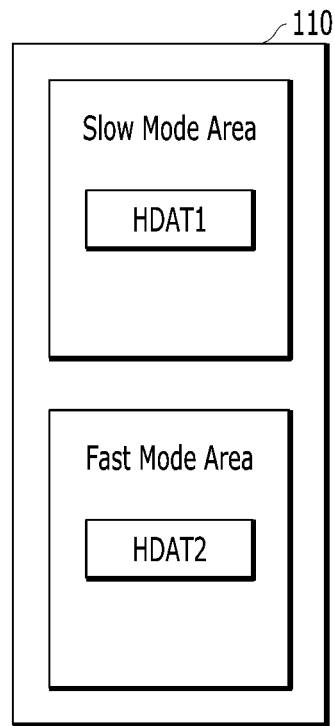
FIGS. 1A to 1C illustrate a memory system capable of performing a copy operation and a read operation in accordance with an embodiment of the present invention.
Figure 1B:
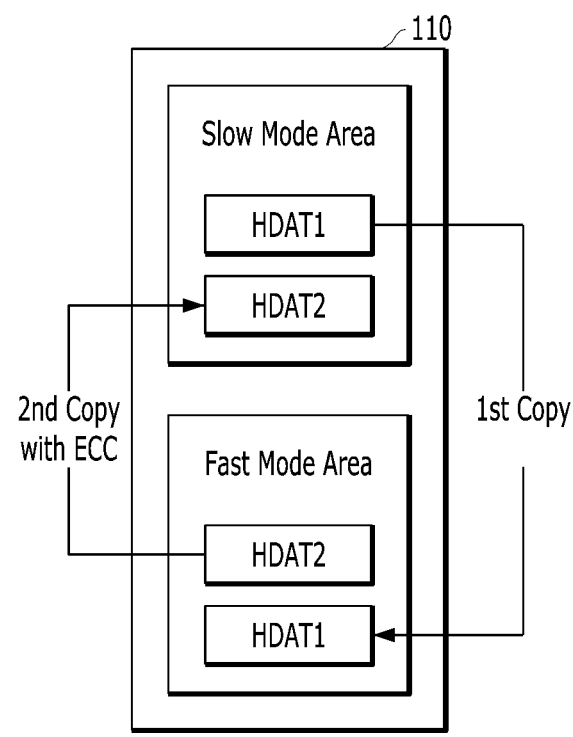
Figure 1C:
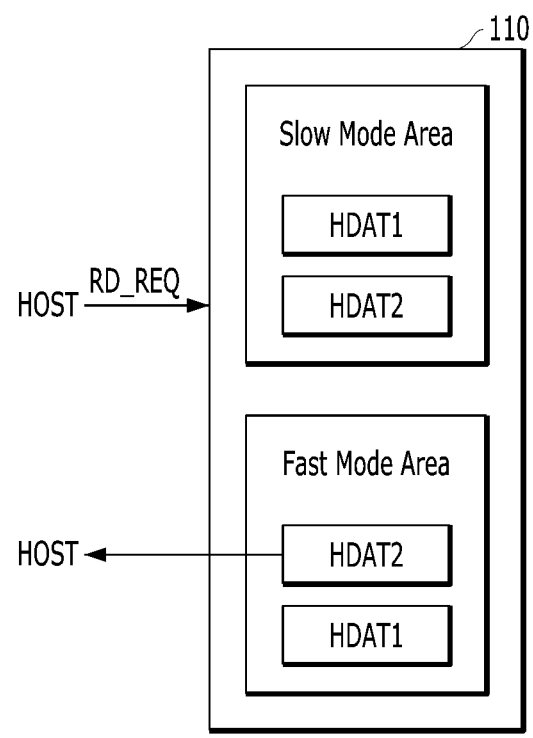

FIGS. 1A to 1C illustrate a data copy operation and a read operation performed by a memory system in accordance with an embodiment of the present invention.

The memory system 110 illustrated in FIGS. 1A to 1C, may include a memory device including a plurality of memory blocks and a controller configured to control the memory device.

In an embodiment, a fast mode area and a slow mode area may be included in the memory device, and divided according to access modes of the corresponding areas. The access mode may include a program operation mode for data to be programmed to the corresponding area and a read operation mode for data stored in the corresponding area. The fast mode area may include an area in which the speed of an access operation including a data read operation and a data program operation is higher than in the slow mode area.

An error correction operation in accordance with the present embodiment may include an error detecting operation and an error correcting operation. The error detecting operation is for detecting error bits contained in the data to be processed in (e.g., outputted from) the memory device. The error correcting operation is for correcting error bits of the data. The error correcting operation is for correcting error bits of the data. The error correcting operation may include determining whether the error correction is successful or not.

An error correction code (ECC) operation can be an example of the error correction operation in accordance with the present embodiment. For performing the error correction operation, the controller in accordance with the present embodiment may include an error correction encoder and an error correction decoder. Here, the error correction encoder can perform error correction encoding of data to be programmed in the memory device to generate encoded data into which a parity bit is added and store the encoded data in memory device. The error correction decoder can detect and correct errors contained in a data read from the memory device when the controller reads the data stored in the memory device. In other words, after performing error correction decoding on the data read from the memory device, the controller can determine whether the error correction has succeeded and output an instruction signal (e.g., a correction success signal or a correction fail signal). The controller can use the parity bit which is generated during the error correction operation encoding process, for correcting the error bit(s) of the read data. When the number of the error bits is greater than or equal to a threshold number of correctable error bits, the controller might not correct error bits but instead may output an error correction fail signal indicating failure in correcting the error bits.

In an embodiment, the fast mode area may include a memory block which is programmed in any one mode of a SLC (Single-Level Cell) mode, an MLC (Multi-Level Cell) mode and a TLC (Triple-Level Cell) mode. In an embodiment, the slow mode area may include a memory block which is programmed in any one mode of the MLC mode, the TLC mode and a QLC (Quadruple-Level Cell) mode.

In the description, the MLC mode, the TLC mode and the QLC mode except the SLC mode will be referred to as an XLC (X-Level Cell) mode. When data are programmed in the SLC mode, the data may be programmed at higher speed than in the XLC mode, and the reliability of the memory cells may be increased more than in the XLC mode. However, the amount of data which can be stored in the SLC mode may be decreased relative to the XLC mode. On the other hand, when data are programmed in the XLC mode, the data may be programmed at lower speed than in the SLC mode, and the reliability of the memory cells may be decreased more than in the SLC mode. However, the amount of data which can be stored may be increased. With the increase in size of data requested by the host for a write operation, the memory system 110 mainly programs the requested write data in the XLC mode.

When the slow mode area includes memory blocks programmed in the MLC mode, the fast mode area may include memory blocks programmed in the SLC mode. When the slow mode area includes memory blocks programmed in the TLC mode, the fast mode area may include memory blocks programmed in any one mode of the SLC mode and the MLC mode. When the slow mode area includes memory blocks programmed in the QLC mode, the fast mode area may include memory blocks programmed in any one mode of the SLC mode, the MLC mode and the QLC mode.

In the SLC mode, 1-bit data is programmed to one memory cell, and programmed 1-bit data is read. Data stored in a memory cell programmed in the SLC mode may include any one of two states (0, 1). In the MLC mode, 2-bit data is programmed to one memory cell, and programmed 2-bit data is read. Data stored in a memory cell programmed in the MLC mode may include any one of four states (00, 01, 10, 11). In the TLC mode, 3-bit data is programmed to one memory cell, and programmed 3-bit data is read. Data stored in a memory cell programmed in the TLC mode may include any one of eight states (000, 001, 010, 100, . . . , 111). In the QLC mode, 4-bit data is programmed to one memory cell, and programmed 4-bit data is read. Data stored in a memory cell programmed in the QLC mode may include any one of 16 states (0000, 0001, 0010, 0100, 1000, . . . , 1111). That is, the number of state values of data which can be stored in a memory cell included in the fast mode area may be less than the number of state values of data which can be stored in a memory cell included in the slow mode area.

In an embodiment, the data copy operation may include a first copy operation and a second copy operation.

When hot data HDAT1 is stored only in the slow mode area as illustrated in FIG. 1A, the memory system 110 may copy the hot data HDAT1 stored in the slow mode area into the fast mode area through the first copy operation as illustrated in FIG. 1B. Thus, the hot data HDAT1 may be stored in the slow mode area and the fast mode area.

At this time, the first copy operation may not include an error correction operation. That is, since the data copied through the first copy operation is programmed to the fast mode area without an ECC operation, the data may not be transmitted to the controller 130. Thus, the resource of a data transmission line coupled between the memory device and the controller may not be consumed, and the data copy operation time may be reduced. The first copy operation will be described below in more detail with reference to FIGS. 6A and 6B.

When hot data HDAT2 is stored only in the fast mode area as illustrated in FIG. 1A, the memory system 110 may copy the hot data HDAT2 stored in the fast mode area into the slow mode area through the second copy operation as illustrated in FIG. 1(b). Thus, the hot data HDAT2 may be stored in the slow mode area and the fast mode area.

At this time, the second copy operation may include error correction operation. That is, the data copied through the second copy operation may be subjected to an error correction operation, and then programmed to the slow mode area. Thus, the reliability of the data copied through the copy operation can be improved. Detailed contents related to the second copy operation will be described below in detail with reference to FIGS. 7A and 7B.

A background operation may be performed in the fast mode area (for example, garbage collection, read reclaim and wear levelling) and may include the first copy operation of copying valid hot data HDAT1, stored in the fast mode area, into another memory block having the fast access mode. Furthermore, a background operation may be performed in the slow mode area and may include the second copy operation of copying valid hot data HDAT2, stored in the slow mode area, into another memory block having the slow access mode.

When a read request RD_REQ with a logical address is received from the host 102 as illustrated in FIG. 1C, the memory system 110 may determine the access mode of the memory block in which data corresponding to the logical address is stored.

When the data which is requested by the host 102 for a read operation and corresponds to the logic address is hot data HDAT2 and the hot data HDAT2 is stored in both of the fast mode area having the fast access mode and the slow mode area having the slow access mode, the memory system 110 may perform a read operation on the data stored in the fast mode area, and transmit the data, stored in the fast mode area on which the read operation has been performed, to the host 102.

For this operation, the memory system 110 may determine whether the error correction operation for the hot data HDAT2 stored in the fast mode area is successful during the read operation. When the error correction operation for the hot data HDAT2 stored in the fast mode area is successful, the memory system 110 may perform the error correction operation on the hot data HDAT2 stored in the fast mode area, and then transmit the error-corrected data to the host 102. The read operation speed of the hot data HDAT2 stored in the fast mode area may be higher than the read operation speed of the hot data HDAT2 stored in the slow mode area.

As such, during a read operation, the memory system 110 in accordance with the present embodiment may output data from the fast mode area where the read operation speed is higher than in the slow mode area, according to a read request, thereby reducing the time required for the read operation.

When the size of data requested by the host for a write operation is equal to or greater than a threshold size, the memory system 110 programs the data in the XLC mode. Furthermore, the memory system 110 reads the data, programmed in the XLC mode, in the XLC mode. Thus, a read operation according to a read request received from the host may be performed in the slow mode area.

The memory system 110 in accordance with the present embodiment can distribute read operations, which may be performed in the slow mode area, to the fast mode area, thereby preventing degradation in characteristic of the memory cells, included in the slow mode area, by the read operations.

When the error correction operation for the hot data HDAT2 stored in the fast mode area is unsuccessful during the read operation, the memory system 110 may perform the error correction operation on the hot data HDAT2 stored in the slow mode area storing the data on which the error correction operation has been performed, and then transmit the error-corrected data to the host 102.

As such, the memory system 110 in accordance with the present embodiment can perform error correction operation on the data stored in the slow mode area, when an error of the data stored in the fast mode area is out of a correction range, thereby avoiding a situation in which error correction for read data to be transmitted to the host 102 is unsuccessful. Thus, the reliability of the read data can be increased. At this time, the data stored in the fast mode area may be the same as the data stored in the slow mode area.

Figure 2:
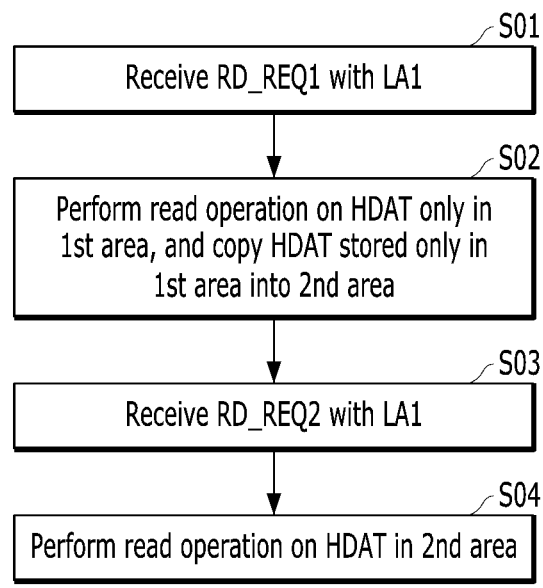
FIG. 2 is a flowchart of a method for performing a first copy operation during a read operation in accordance with an embodiment of the present invention.

FIG. 2 is a flowchart of a method for performing the first copy operation during the read operation in accordance with an embodiment of the present invention. The memory system 110 may include a memory device 150 and a controller 130. The memory device 150 may include a first area SLOW AREA and a second area FAST AREA in which data I/O operation speed is higher than in the first area SLOW AREA, and the controller 130 may perform a read operation on hot data HDAT having a hot property among data stored in the first area SLOW AREA. The hot data HDAT having a hot property may include data whose read count is equal to or more than a preset reference value, the read count indicating the number of read requests from the host.

Referring to FIG. 2, when a first read request RD_REQ1 is received from the host (not illustrated) in step S01, the controller 130 may perform a first read operation on the memory device 150 according to the first read request RD_REQ1.

The controller 130 may control the memory device 150 to copy hot data HDAT into the second area FAST AREA, while performing the first read operation. The copy operation performed in step S02 may include the first copy operation described with reference to FIGS. 1A to 1C.

The memory device 150 may include a page buffer for temporarily storing data outputted from the first and second areas SLOW AREA and FAST AREA, before transferring the data to the controller 130. The controller 130 may copy the hot data HDAT, which is temporarily stored in the page buffer, into the second area FAST AREA through the first copy operation during the first read operation. Thus, the hot data HDAT may be stored in both of the first and second areas SLOW AREA and FAST AREA.

When a second read request RD_REQ2 for the hot data HDAT is received from the host in step S03 after the first read operation is performed, the controller 130 may perform a second read operation according to the second read request RD_REQ2. The controller 130 may access (read) the hot data HDAT copied in the second area FAST AREA in step S04, when performing the second read operation.

At this time, when the hot data HDAT copied in the second area FAST AREA has no error, the controller 130 may transmit the hot data HDAT, copied in the second area FAST AREA, to the host during the second read operation. When the hot data HDAT copied in the second area FAST AREA has an error, the controller 130 may correct the copied hot data HDAT by performing an error correction operation on the hot data HDAT during the second read operation, and then transmit the corrected hot data HDTA to the host.

When the error of the hot data HDAT copied in the second area FAST AREA is not corrected through the error correction operation, the controller 130 may access the hot data HDAT stored in the first area SLOW AREA during the second read operation. When the hot data HDAT stored in the first area SLOW AREA has no error, the controller 130 may transmit the hot data HDAT to the host. When the hot data HDAT stored in the first area SLOW AREA has an error, the controller 130 may correct the hot data HDAT by performing an error correction operation on the hot data HDAT, and then transmit the corrected hot data HDTA to the host.

The controller 130 may generate, delete or correct map information for translating a logical address into a physical address, and associate the map information with a hot property which is decided based on the read count indicating a data access frequency. This process will be described in detail with reference to FIGS. 10A and 10B.

The first area SLOW AREA may include a memory block constituted by nonvolatile memory cells each capable of storing multi-bit data therein, and the second area FAST AREA may include a memory block constituted by nonvolatile memory cells each capable of storing 1-bit data therein. The data I/O operation speed may indicate the speed of an operation of programming data to a nonvolatile memory cell included in the first and second areas SLOW AREA and FAST AREA, or reading the programmed data.

Figure 3:
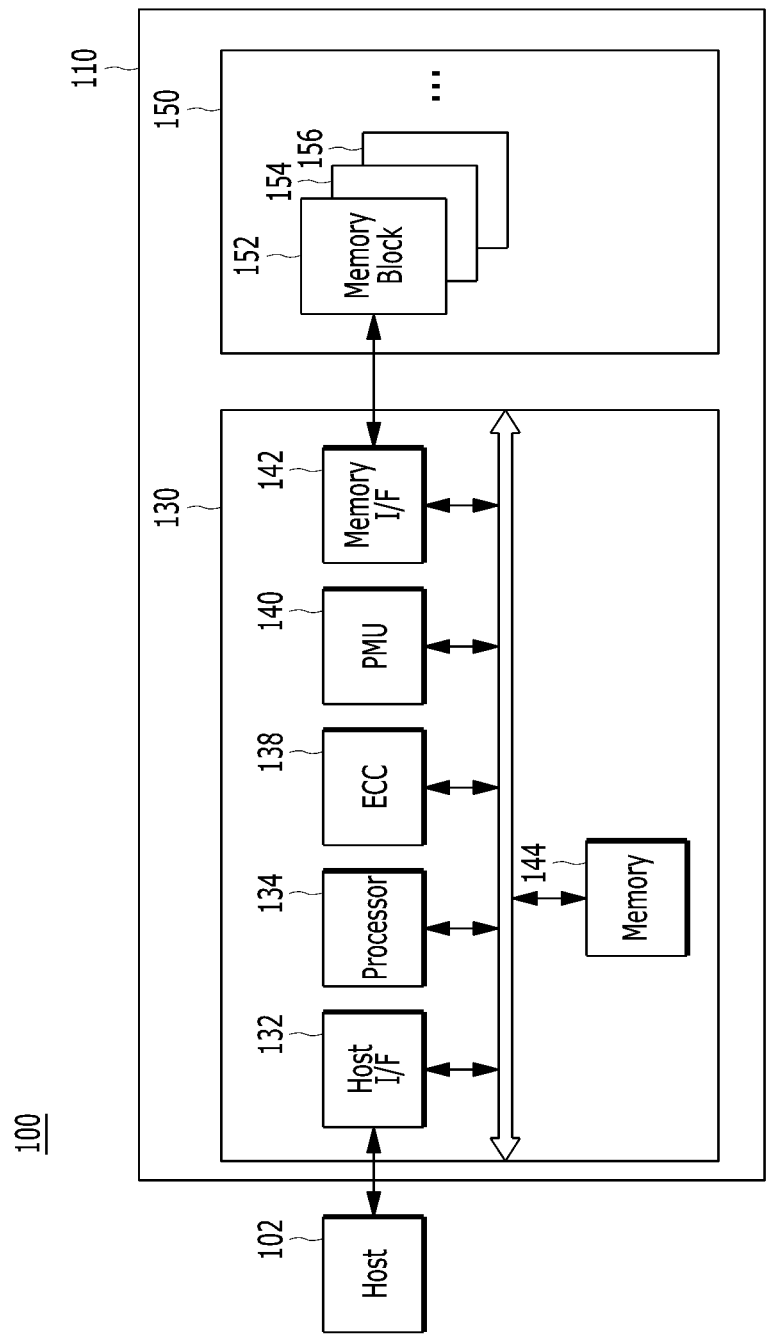
FIG. 3 is a schematic diagram illustrating a data processing system in accordance with an embodiment of the present invention.

FIG. 3 is a block diagram illustrating a data processing system 100 in accordance with an embodiment of the present invention.

Referring to FIG. 3, a data processing system 100 may include a host 102 operably engaged with a memory system 110.

The host 102 may include, for example, any of various portable electronic devices such as a mobile phone, an MP3 player and a laptop computer, or an electronic device such as a desktop computer, a game player, a television (TV), a projector, and/or the like.

The host 102 also includes at least one operating system (OS), which generally manages and controls functions and operations performed in the host 102. The OS can provide interoperability between the host 102 engaged with the memory system 110 and the user of the memory system 110. The OS may support functions and operations corresponding to a user's requests. By way of example but not limitation, the OS can be a general operating system or a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems with the memory system 110, corresponding to a user's request. The host 102 may transmit a plurality of commands corresponding to the user's requests to the memory system 110, thereby performing operations corresponding to commands within the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid-state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage device(s) for the memory system 110 may be implemented with a volatile memory device, for example, a dynamic random-access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and/or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems discussed above in the examples.

By way of example but not limitation, the controller 130 and the memory device 150 may be integrated into an SSD for improving an operation speed. When the memory system 110 is used as an SSD, the operating speed of the host 102 connected to the memory system 110 can be improved more than that of the host 102 implemented with a hard disk. In another embodiment, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMC micro), a SD card (SD, mini SD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even without electrical power being supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be embodied in a three-dimensional stack structure.

The controller 130 may control overall operations of the memory device 150, such as read, write, program, and erase operations. For example, the controller 130 may control the memory device 150 in response to a request from the host 102. The controller 130 may provide data, read from the memory device 150, to the host 102. The controller 130 may also store data, provided by the host 102, into the memory device 150.

The controller 130 may include a host interface (I/F) 132, a processor 134, an error correction code (ECC) component 138, a power management unit (PMU) 140, a memory interface (I/F) 142, and memory 144, all operatively coupled via an internal bus.

The host interface 132 may process commands and data provided by the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI), and/or integrated drive electronics (IDE). In accordance with an embodiment, the host interface 132 is a component for exchanging data with the host 102, which may be implemented through firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit(s) of the read data. When the number of the error bits is greater than or equal to a threshold number of correctable error bits, the ECC component 138 might not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), and/or a Block coded modulation (BCM). The ECC component 138 may include any and all circuits, modules, systems or devices for performing the error correction operation based on at least one of the above described codes.

The PMU 140 may manage electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of a NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data received from the host 102 in the memory device 150. The memory 144 may be used to store data for the controller 130 and the memory device 150 to perform operations such as read operations or program/write operations.

The memory 144 may be implemented as a volatile memory. The memory 144 may be implemented with a static random-access memory (SRAM), a dynamic random-access memory (DRAM), or both. Although FIG. 2 illustrates, for example, the second memory 144 disposed within the controller 130, embodiments are not limited thereto. That is, the memory 144 may be located within or external to the controller 130. For instance, the memory 144 may be embodied by an external volatile memory having a memory interface transferring data and/or signals between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 controls a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling, and the like. Particularly, the FTL may load, generate, update, or store map data. Therefore, the controller 130 may map a logical address, which is entered from the host 102, with a physical address of the memory device 150 through the map data. The memory device 150 may operate like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 can handle instructions or commands corresponding to a command received from the host 102. The controller 130 can perform a foreground operation as a command operation, corresponding to an command received from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes copying data stored in a memory block among the memory blocks 152, 154, 156 and storing such data in another memory block, e.g., a garbage collection (GC) operation. The background operation can include moving data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands entered from the host 102. For example, when performing program operations corresponding to program commands, read operations corresponding to read commands, and erase operations corresponding to erase commands, such operations may be performed sequentially, i.e., in groups of particular type of command, randomly, or alternately, i.e., alternate between the different types of commands, the controller 130 can determine which channel(s) or way(s) among a plurality of channels or ways for connecting the controller 130 to a plurality of memory dies included in the memory 150 is/are proper or appropriate for performing each operation. The controller 130 can transmit data or instructions via determined channels or ways for performing each operation. The plurality of memory dies in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine the state of each channel or each way as a busy state, a ready state, an active state, an idle state, a normal state, and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe relevant information about the memory device 150. For instance, the descriptors may include device descriptors, configuration descriptors, unit descriptors, and the like. Each descriptor is data which may have a set format or structure. The controller 130 can refer to, or use, the descriptors to determine which channel(s) or way(s) an instruction or a data is exchanged on.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 4:
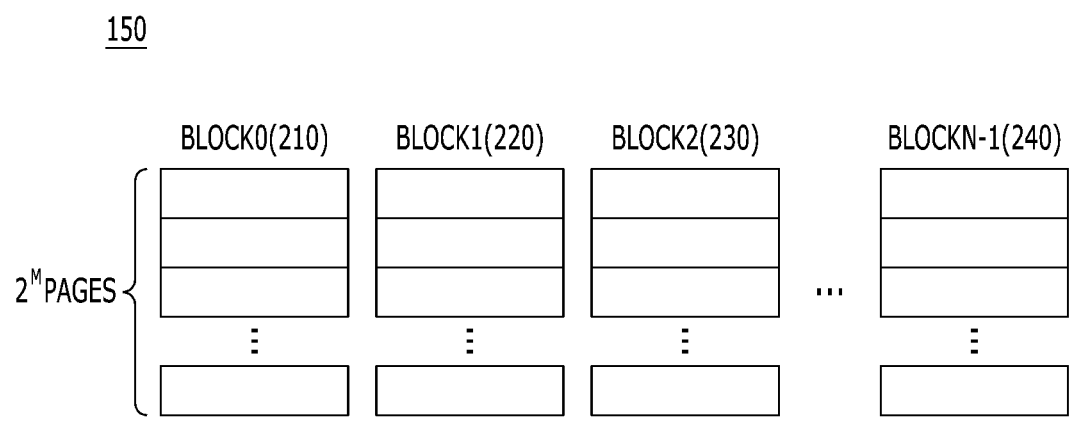
FIG. 4 illustrates a configuration of a memory device shown in FIG. 3 in accordance with an embodiment of the present invention.

FIG. 4 is a diagram illustrating a configuration of a memory cell array 330 of a memory block in the memory device 150.

Referring to FIG. 4, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example 2M pages, the number of which may vary according to circuit design. For example, in some applications, each of the memory blocks may include M pages. Each of the pages may include a plurality of memory cells that are coupled to a word line WL.

Furthermore, each of the plurality of memory blocks in the memory device 150 may be implemented with a single level cell (SLC) memory block with memory cells each capable of storing one bit of data, or a multi-level cell (MLC) memory block with memory cells each capable of storing two or more bits of data. Some examples of MLC memory blocks are a double level cell memory block (also called an MLC memory block), a triple level cell (TLC) memory block, and a quadruple level cell (QLC) memory block.

According to an embodiment of the present invention, the memory device 150 may be a non-volatile memory, such as a flash memory, e.g., a NAND flash memory. However, the memory device 150 may be realized as any one of a Phase Change Random-access Memory (PCRAM), a Resistive Random-access Memory (RRAM or ReRAM), a Ferroelectric Random-access Memory (FRAM), a Spin Transfer Torque Magnetic Random-access Memory (SU-RAM or STT-MRAM) and the like.

The memory blocks 210, 220, 230, . . . 240 may store the data transferred from a host through a program operation, and transfer data stored therein to the host through a read operation.

Figure 5:
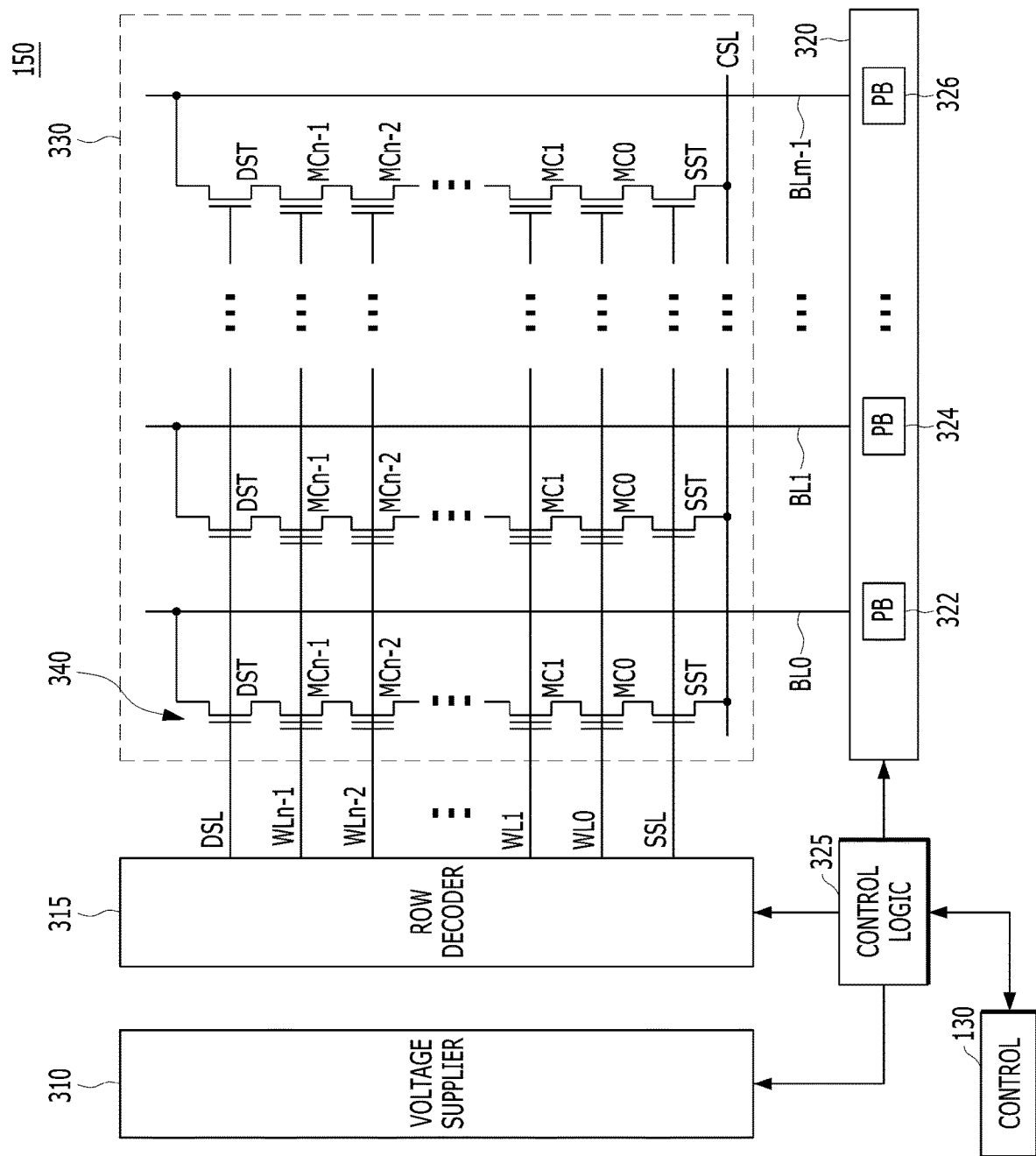
FIG. 5 illustrates a configuration of a memory cell array of a memory block in a memory device in accordance with an embodiment of the present invention.

FIG. 5 is a circuit diagram illustrating a configuration of a memory cell array 330 of a memory block in the memory device 150.

Referring to FIG. 4, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example 2M pages, the number of which may vary according to circuit design. For example, in some applications, each of the memory blocks may include M pages. Each of the pages may include a plurality of memory cells that are coupled to a word line WL.

Furthermore, each of the plurality of memory blocks in the memory device 150 may be implemented with a single level cell (SLC) memory block with memory cells each capable of storing one bit of data, or a multi-level cell (MLC) memory block with memory cells each capable of storing two or more bits of data. Some examples of MLC memory blocks are a double level cell memory block (also called an MLC memory block), a triple level cell (TLC) memory block, and a quadruple level cell (QLC) memory block.

According to an embodiment of the present invention, the memory device 150 may be a non-volatile memory, such as a flash memory, e.g., a NAND flash memory. However, the memory device 150 may be realized as any one of a Phase Change Random-access Memory (PCRAM), a Resistive Random-access Memory (RRAM or ReRAM), a Ferroelectric Random-access Memory (FRAM), a Spin Transfer Torque Magnetic Random-access Memory (SU-RAM or STT-MRAM) and the like.

The memory blocks 210, 220, 230, . . . 240 may store the data transferred from a host through a program operation, and transfer data stored therein to the host through a read operation.

FIG. 5 is a circuit diagram illustrating a memory block 330 in the memory device 150.

Referring to FIG. 5, the memory device 150 may include a memory block 330 comprising a plurality of memory cell arrays, a row decoder 315, a read/write circuit 320 and a voltage supplier 310.

Referring to FIG. 5, the memory block 330 may correspond to any of the plurality of memory blocks 152 to 156.

The memory block 330 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured as single level cells (SLC) each of which may store 1 bit of information, or by multi-level cells (MLC) each of which may store data information of a plurality of bits. The strings 340 may be electrically coupled to the corresponding bit lines BL0 to BLm−1, respectively. For reference, in FIG. 5, 'DSL' denotes a drain select line, 'SSL' denotes a source select line, and 'CSL' denotes a common source line.

While FIG. 5 only shows, as an example, that the memory block 330 is constituted with NAND flash memory cells, it is to be noted that the memory block 330 of the memory device 150 is not limited to a NAND flash memory. The memory block 330 may be realized by a NOR flash memory, a hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supplier 310 of the memory device 150 may provide word line voltages, for example, a program voltage, a pass voltage, a selection read voltage and non-selection read voltage, among other possible voltages to be supplied to respective word lines according to an operation mode and voltages to be supplied to bulks, for example, well regions in which the memory cells are formed. The voltage supplier 310 may perform a voltage generating operation under the control of control logic 325. The voltage supplier 310 may generate a plurality of variable read voltages to generate a plurality of read data, select one of the memory blocks or sectors of a memory cell array under the control of the control logic 325, select one of the word lines of the selected memory block, and provide the word line voltages to the selected word line and unselected word lines.

The row decoder 315 of the memory device 150 may select one of a plurality of the memory blocks 330 in response to an address ADDR. The row decoder 315 may select one of word lines of the selected memory block. The row decoder 315 may transfer a word line voltage, from the voltage supplier 310 to the selected word line. During a program operation, the row decoder 315 may transfer a program/verification voltage to the selected word line and a pass voltage Vpass to each of unselected word lines.

The read/write circuit 320 of the memory device 150 may be controlled by the control logic 325, and may serve as a sense amplifier or a write driver according to an operation mode. During a verification operation or a normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may page buffers 322 to 326 respectively corresponding to columns (or bit lines) or column pairs (or bit line pairs), and each of the page buffers 322 to 326 may include a plurality of latches (not illustrated).

The control logic 325 may control the row decoder 315, the read/write circuit 320, and the voltage supplier 310 in response to a command from a controller 130. The control logic 325 may control the voltage supplier 310 and the read/write circuit 320 in response to a write command such that data (DATA) from the outside are programmed in selected memory cells. For example, the selected memory cells may be programmed in an incremental step pulse programming (ISPP) scheme under control of the control logic 325.

In the ISPP scheme, a program cycle for programming the selected memory cells (e.g., memory cells connected to one word line) is performed. One program cycle (or program operation) is composed of a plurality of program loops. In each program loop, at least one program pulse and at least one verification pulse are used. The program pulse has a level of the program voltage Vpgm, and the verification pulse has a level of the verification voltage. In the ISPP scheme, a level of the program voltage Vpgm may increase as a loop count increases.

Figure 6A:
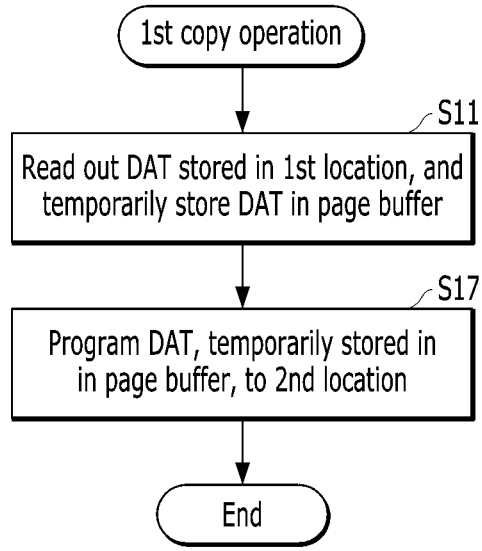
FIGS. 6A and 6B illustrate a first copy operation in accordance with an embodiment of the present invention.
Figure 6B:
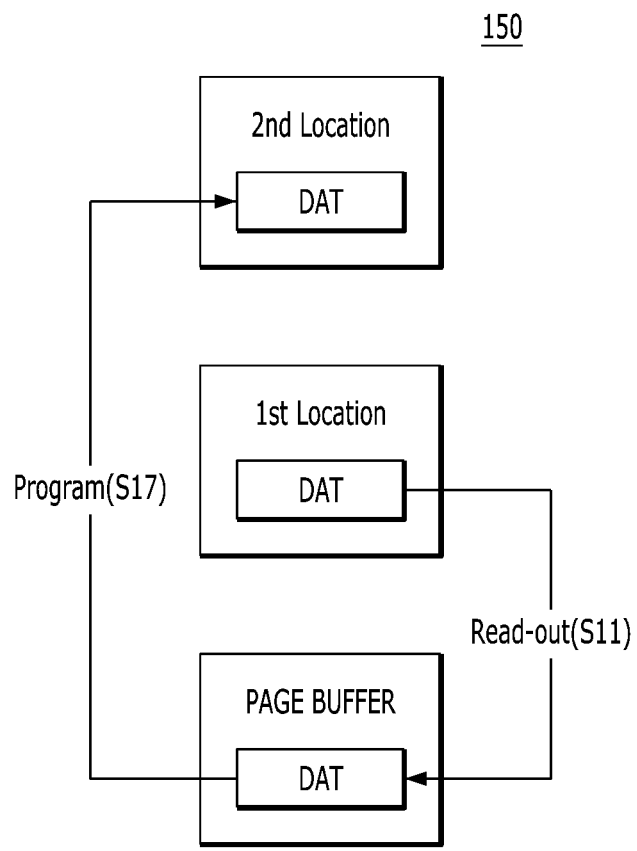

FIG. 6A illustrates an example in which the memory system performs the first copy operation. FIG. 6B illustrates a part of the memory device in which the first copy operation is performed. Hereafter, referring to FIGS. 3, 6A and 6B, the first copy operation performed by the memory system in accordance with an embodiment of the present invention, will be described.

The first copy operation includes an operation of copying data, stored in a first location (for example, slow mode area) of a memory die, into a second location (for example, fast mode area) of the memory die, without transmitting the data to the controller 130 outside the memory device 150. The first and second locations may be included in the same memory die, or included in different memory dies. The first copy operation may include a copy-back operation.

During the first copy operation, the data stored in the first location of the memory die is read out and stored in the page buffer in step S11. The data stored in the page buffer is programmed to the second location of the memory die in step S17.

Since the first copy operation does not include an error correction operation of detecting an error included in data and correcting the detected error, the resource of the data transmission line may not be consumed, and the data copy operation time by data input/output may not be increased.

However, when target data on which the first copy operation is to be performed includes an error, the data copied into a new location may also include an error. That is, when the data including an error is copied several times, for example, when valid data is copied for a background operation, errors which additionally occur may be continuously accumulated. Therefore, when only the first copy operation is performed to copy data, it may cause data to have errors which cannot be corrected because the errors were out of an error correction range.

Figure 7A:
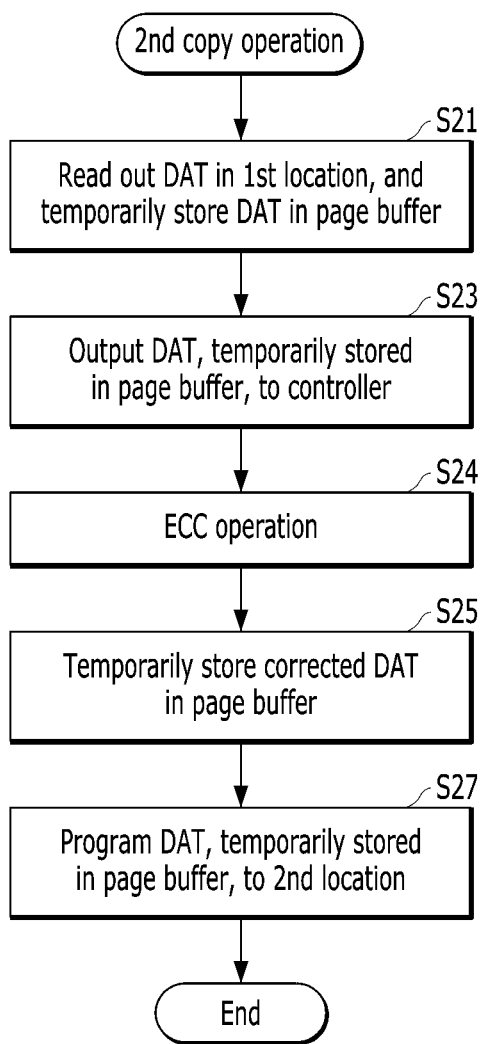
FIGS. 7A and 7B illustrate a second copy operation in accordance with an embodiment of the present invention.
Figure 7B:
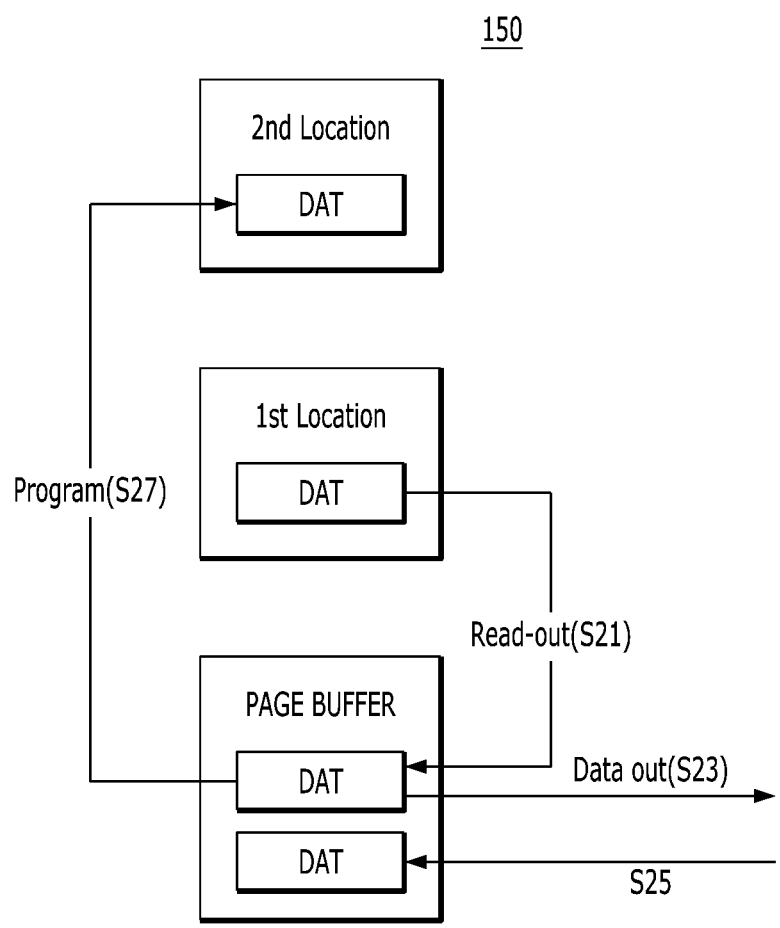

FIG. 7A illustrates an example in which the memory system performs the second copy operation. FIG. 7B illustrates a part of the memory device in which the second copy operation is performed. Hereafter, referring to FIGS. 3, 7A and 7B, the second copy operation performed by the memory system in accordance with an embodiment of the present invention, will be described.

The second copy operation includes an operation of transmitting data, stored in a first location of a memory die, to the controller to perform error correction, and copying the corrected data into a second location. The first and second locations may be included in the same memory die, or included in different memory dies.

During the second copy operation, the data stored in the first location of the memory device is read out and then stored in the page buffer in step S21. The data stored in the page buffer is transmitted to the controller through the data transmission line in step S23.

The controller performs the error correction operation in the received data in step S24. The corrected data is inputted to the memory die through the data transmission line again, and then stored in the page buffer, in step S25. The data stored in the page buffer is programmed to the second location of the memory die in step S27.

During the above-described second copy operation, the copy operation time may be increased by the error correction operation including error detection and error correction, which is performed in step S24. Even when the first and second locations are included in the same memory die, the data needs to be transmitted to the controller 130 through the data transmission line for error correction. Then, the corrected data needs to be inputted to the memory device 150 through the data transmission line again. Thus, the resource of the data transmission line may be consumed, and the data copy operation time may be increased by data input/output.

FIG. 8A to 8D illustrate examples of operations of memory blocks according to the access modes.

Hereafter, the operations of the memory blocks which operate in the SLC mode, the MLC mode and the TLC mode in accordance with the present embodiment will be described with reference to FIGS. 3 and 8A to 8D.

Figure 8A:
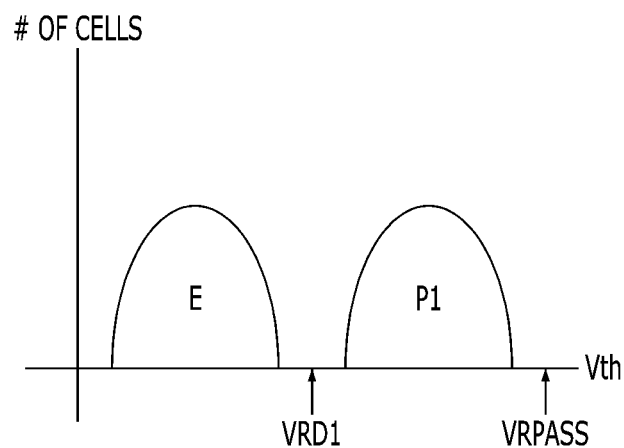
FIG. 8A to 8D illustrate an example of an operation of a memory block in an access mode.

FIG. 8A is a diagram for describing a read operation of a memory block which operates in the SLC mode. In FIG. 8A, the horizontal axis indicates the threshold voltages of memory cells included in the memory block operating in the SLC mode, and the vertical axis indicates the number of memory cells. As indicated in FIG. 8A, when the memory block operates in the SLC mode, the memory cells may have an erase state E and a program state P. In this case, during a read operation, the states of the memory cells may be determined based on a first read voltage VRD1. When the read operation is performed, a read pass voltage VRPASS, which is high enough to turn on memory cells coupled to unselected word lines regardless of the states E or P of the memory cells, may be applied to the unselected word lines.

Figure 8B:
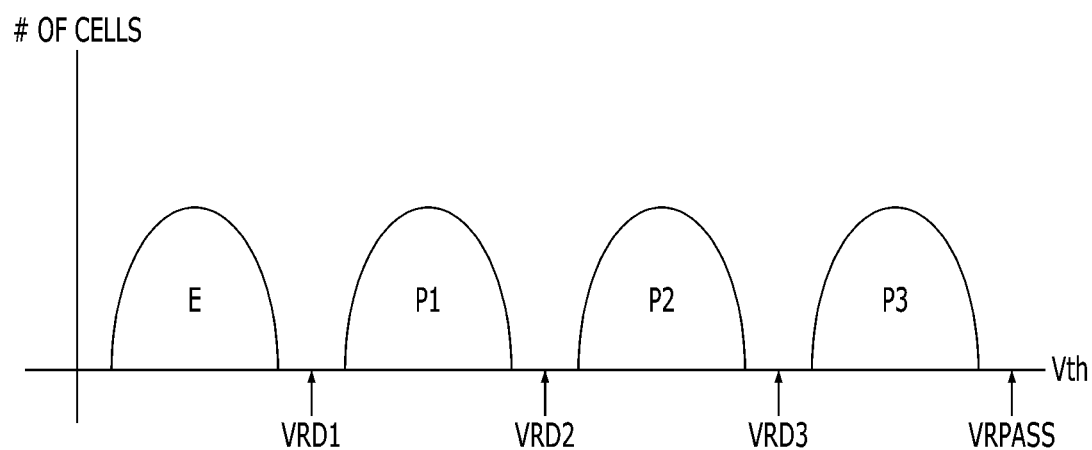

FIG. 8B is a diagram for describing a read operation of a memory block which operates in the MLC mode. In FIG. 8B, the horizontal axis indicates the threshold voltages of memory cells included in the memory block operating in the MLC mode, and the vertical axis indicates the number of memory cells. As illustrated in FIG. 8B, when the memory block operates in the MLC mode, the memory cells may have the erase state E and first to third program states P1 to P3. In this case, during a read operation, the states of the memory cells may be determined based on first to third read voltages VRD1 to VRD3. When the read operation is performed, the read pass voltage VRPASS, which is high enough to turn on memory cells coupled to unselected word lines regardless of the states E and P1 to P3 of the memory cells, may be applied to the unselected word lines.

Figure 8C:
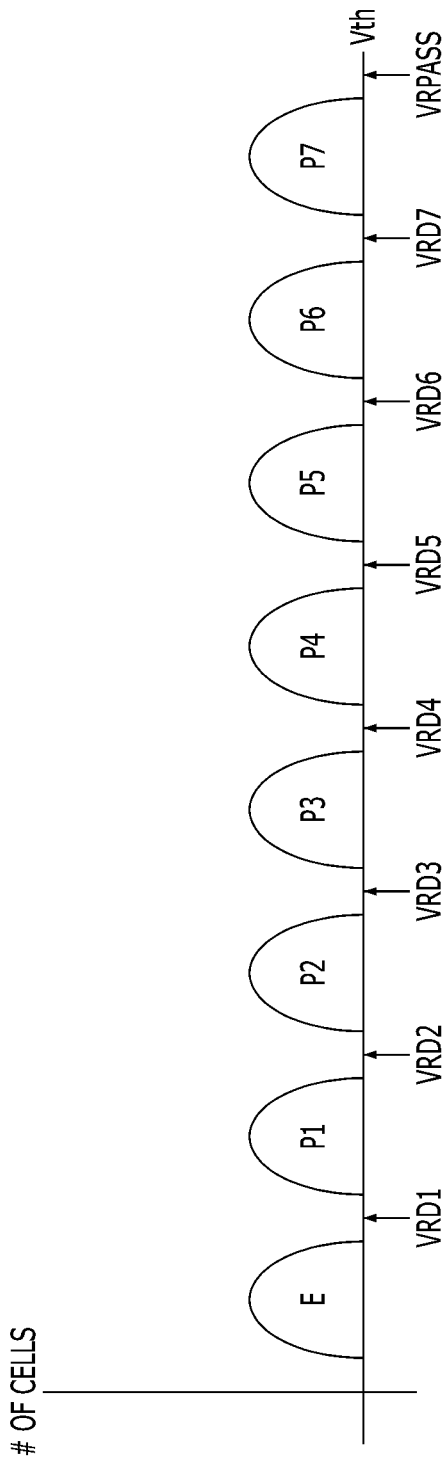

FIG. 8C is a diagram for describing a read operation of a memory block which operates in the TLC mode. In FIG. 8C, the horizontal axis indicates the threshold voltages of memory cells included in the memory block operating in the TLC mode, and the vertical axis indicates the number of memory cells. As illustrated in FIG. 8C, when the memory block operates in the TLC mode, the memory cells may have the erase state E and first to seventh program states P1 to P7. In this case, during a read operation, the states of the memory cells may be determined based on first to seventh read voltages VRD1 to VRD7. When the read operation is performed, the read pass voltage VRPASS, which is high enough to turn on memory cells coupled to unselected word lines regardless of the states E and P1 to P7 of the memory cells, may be applied to the unselected word lines.

Figure 8D:
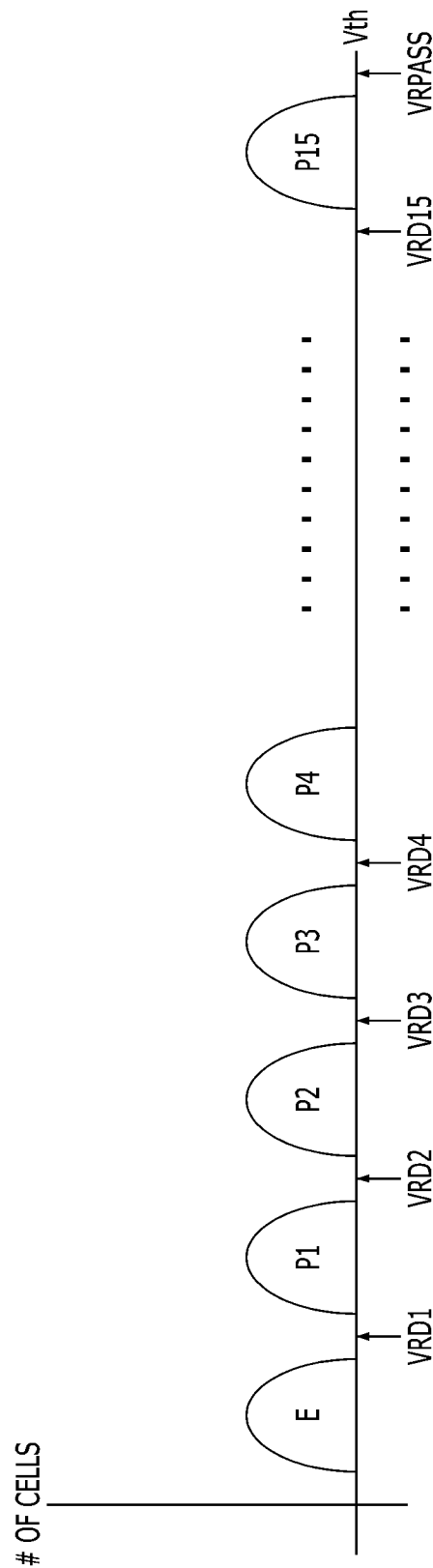

FIG. 8D is a diagram for describing a read operation of a memory block which operates in the QLC mode. In FIG. 8D, the horizontal axis indicates the threshold voltages of memory cells included in the memory block operating in the QLC mode, and the vertical axis indicates the number of memory cells. As illustrated in FIG. 8D, when the memory block operates in the QLC mode, the memory cells may have the erase state E and first to 15th program states P1 to P15. In this case, during a read operation, the states of the memory cells may be determined based on first to 15th read voltages VRD1 to VRD15. When the read operation is performed, the read pass voltage VRPASS, which is high enough to turn on memory cells coupled to unselected word lines regardless of the states E and P1 to P15 of the memory cells, may be applied to the unselected word lines.

As described above, the state value of data stored in a memory cell operating in the SLC mode may be checked by applying the first read voltage VRD1 only once. However, the state value of data stored in a memory cell operating in the QLC mode may be checked by applying the first to 15th read voltages VRD1 to VRD15. Therefore, the time required for the read operation performed on the memory cell operating in the QLC mode may become longer than the time required for the read operation performed on the memory cell operating in the SLC mode.

Figure 9:
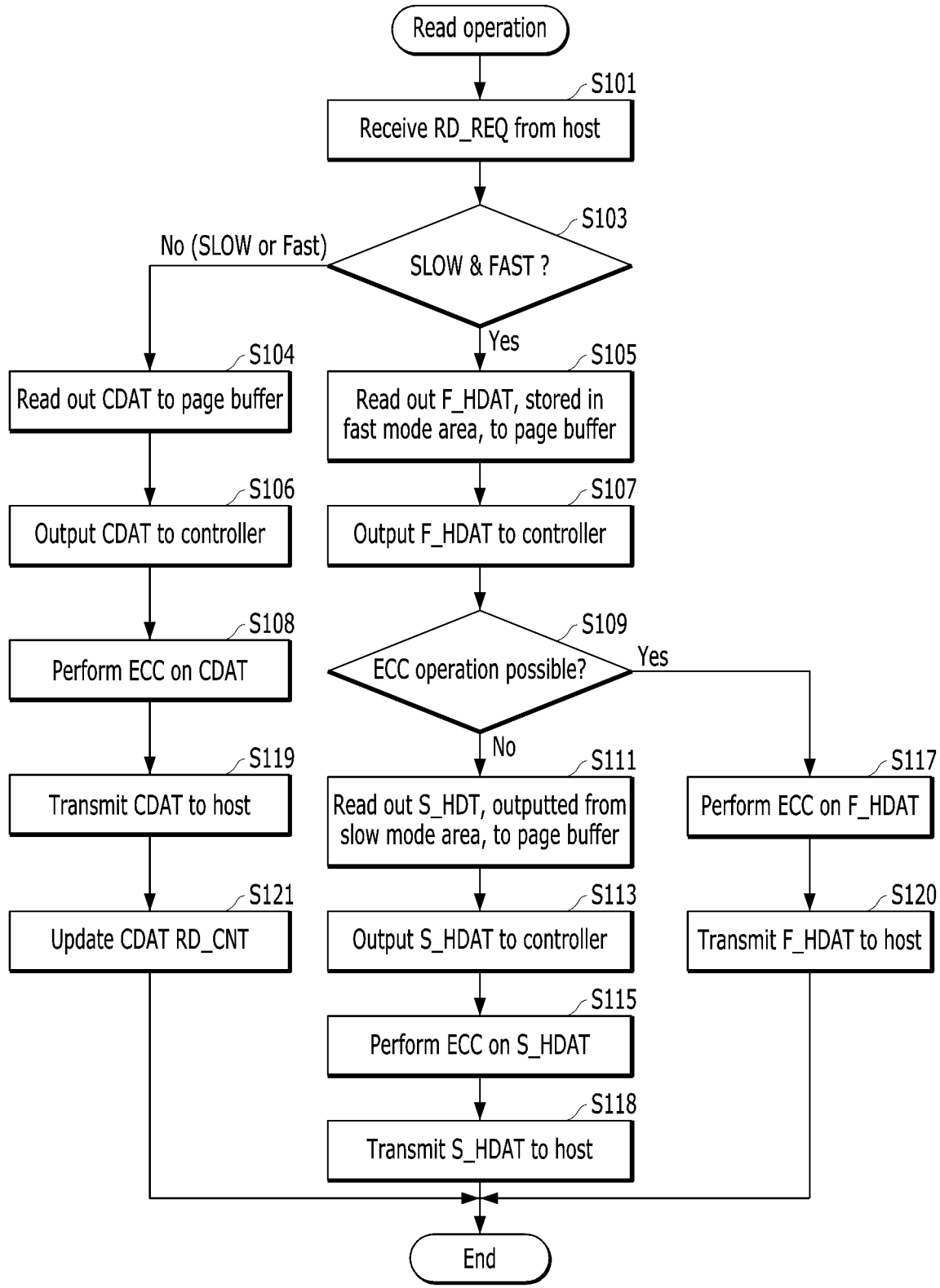
FIG. 9 illustrates a read operation in a memory system in accordance with an embodiment of the present invention.

FIG. 9 is a flowchart of a method in which the memory system performs a read operation in accordance with an embodiment of the present invention.

Referring to FIGS. 3 and 9, when a read request RD_REQ including a logical address is received from the host 102 in step S101, the controller 130 may determine whether data DAT corresponding to the received logical address is stored in both of the slow mode area and the fast mode area, in step S103. At this time, the controller 130 may perform the determination by referring to map data illustrated in FIG. 10B.

The read operation speed of data DAT stored in the fast mode area may be higher than the read operation speed of data HDAT stored in the slow mode area. For example, the fast mode area may include memory blocks operating in the SLC mode, and the slow mode area may include memory blocks operating in the XLC mode (MLC, TCL or QLC mode). However, the present embodiment is not limited thereto.

When the determination result of step S103 indicates that the data DAT corresponding to the logical address is not stored in either the slow mode area or the fast mode area (No in step S103), the controller 130 may determine that the data DAT corresponding to the logical address is cold data CDAT stored in only the slow mode area or the fast mode area. Thus, the controller 130 may read out the cold data CDAT, and store the read data in the page buffer, in step S104. The controller 130 controls the memory device 150 so that the cold data CDAT stored in the page buffer is output (e.g., data-out) to the controller 130. The controller 130 temporarily stores the cold data CDAT in the memory 144, in step S106. The controller 130 detects an error included in the cold data CDAT which is temporarily stored in the memory 144, and performs an ECC operation for correcting the detected error, in step S108. The controller 130 transmits the cold data CDTA, whose error has been corrected, to the host 102 in step S119.

The controller 130 may update the state value of a read count RD_CNT for the logical address, included in the read request RD_REQ received in step S101, by increasing the state value by 1, in step S121. When the value of the read count RD_CNT updated in step S121 becomes equal to or more than a preset reference value REF, the controller 130 may determine that the data DAT corresponding to the logical address LBA has been changed from cold data CDAT to hot data HDAT, according to the read request RD_REQ received in step S101. Thus, the controller 130 may store the hot data, stored in the slow mode area or the fast mode area, into both of the slow mode area and the fast mode area by performing the first or second copy operation which will be described below with reference to FIGS. 10A and 10B. The controller 130 may add a physical address of the fast mode area or the slow mode area, on which the first or second copy operation is performed, to the map data of the logical address.

When the determination result of step S103 indicates that the data DAT corresponding to the logical address LBA is stored in both of the slow mode area and the fast mode area (Yes in step S103), the controller 130 may determine that the data DAT corresponding to the logical address LBA is hot data HDAT stored in both of the slow mode area and the fast mode area. Thus, the controller 130 reads out the hot data F_HDAT stored in the fast mode area, between the hot data stored in the slow mode area and the fast mode area, and then stores the read data in the page buffer, in step S105. The controller 130 controls the memory device 150 so that the hot data F_HDAT, stored in the page buffer and outputted from the fast mode area is output (e.g., data-out) to the controller 130. The controller 130 temporarily stores the hot data F_HDAT in the memory 144, in step S107.

The controller 130 performs an ECC operation including an error detecting operation for detecting an error contained in the hot data F_HDAT which is temporarily stored in the memory 144 and outputted from the fast mode area and an error correction operation for correcting the detected error contained in the hot data F_HDAT, in step S109A.

The controller 130 may can determine whether the error correction has succeeded and output an instruction signal (e.g., a correction success signal or a correction fail signal) during the error correction operation, in step S109B.

When the number of the error bits is greater than or equal to a threshold number of correctable error bits, the controller 130 might not correct error bits but instead may output an error correction fail signal indicating failure in correcting the error bits. When the number of the error bits is less than the threshold number of correctable error bits, the controller 130 might correct error bits using the parity bit generated in the ECC encoding process.

That is to say, the controller 130 determines whether the detected error is correctable or not, in step S109B. The error contained in data may be determined as correctable or uncorrectable through the error detecting operation. For example, when an amount of error contained in data is equal to or greater than a predetermined set value, the error is determined as uncorrectable. when the amount of the error contained in the data is smaller than the predetermined set value, the error is determined as correctable. When the determination result of step S109B indicates that the detected error is correctable (Yes in S109B), the controller 130 transmits the hot data F_HDTA, which was outputted from the fast mode area and whose error was corrected, to the host 102 in step S120.

As such, when the read operation is performed, the memory system 110 in accordance with the present embodiment may output data F_HDAT from the fast mode area where the read operation speed is higher than in the slow mode area, according to a read request, thereby reducing the time required for the read operation.

The memory system 110 in accordance with the present embodiment can distribute read operations, which can be performed only on the slow mode area, to the fast mode area, thereby preventing degradation in characteristic of the memory cells, included in the slow mode area, by the read operations.

When the determination result of step S109B indicates that the detected error of the hot data F_HDAT outputted from the fast mode area is not correctable (No in S109B), the controller 130 reads out hot data S_HDAT stored in the slow mode area, and then stores the read data in the page buffer, in step S111. The controller 130 outputs the hot data S_HDAT, stored in the page buffer and outputted from the slow mode area, to the controller 130, and temporarily stores the hot data S_HDAT in the memory 144, in step S113. The controller 130 performs an ECC operation on the hot data S_HDAT which is temporarily stored in the memory 144 and outputted from the slow mode area, in step S115. The controller 130 transmits the hot data S_HDTA, which was outputted from the slow mode area and whose error was corrected, to the host 102 in step S118.

After steps S120 and S118, the controller 130 may update the state value of the read count RD_CNT for the logical address, included in the read request RD_REQ received in step S101, by increasing the state value by 1.

As such, the memory system 110 in accordance with the present embodiment may perform error correction on the data stored in the slow mode area, when an error of the data stored in the fast mode area is out of a correction range, thereby avoiding a situation in which error correction for read data to be transmitted to the host 102 is unsuccessful. Thus, the reliability of the read data can be increased. At this time, the data stored in the fast mode area may be the same as the data stored in the slow mode area.

Figure 10A:
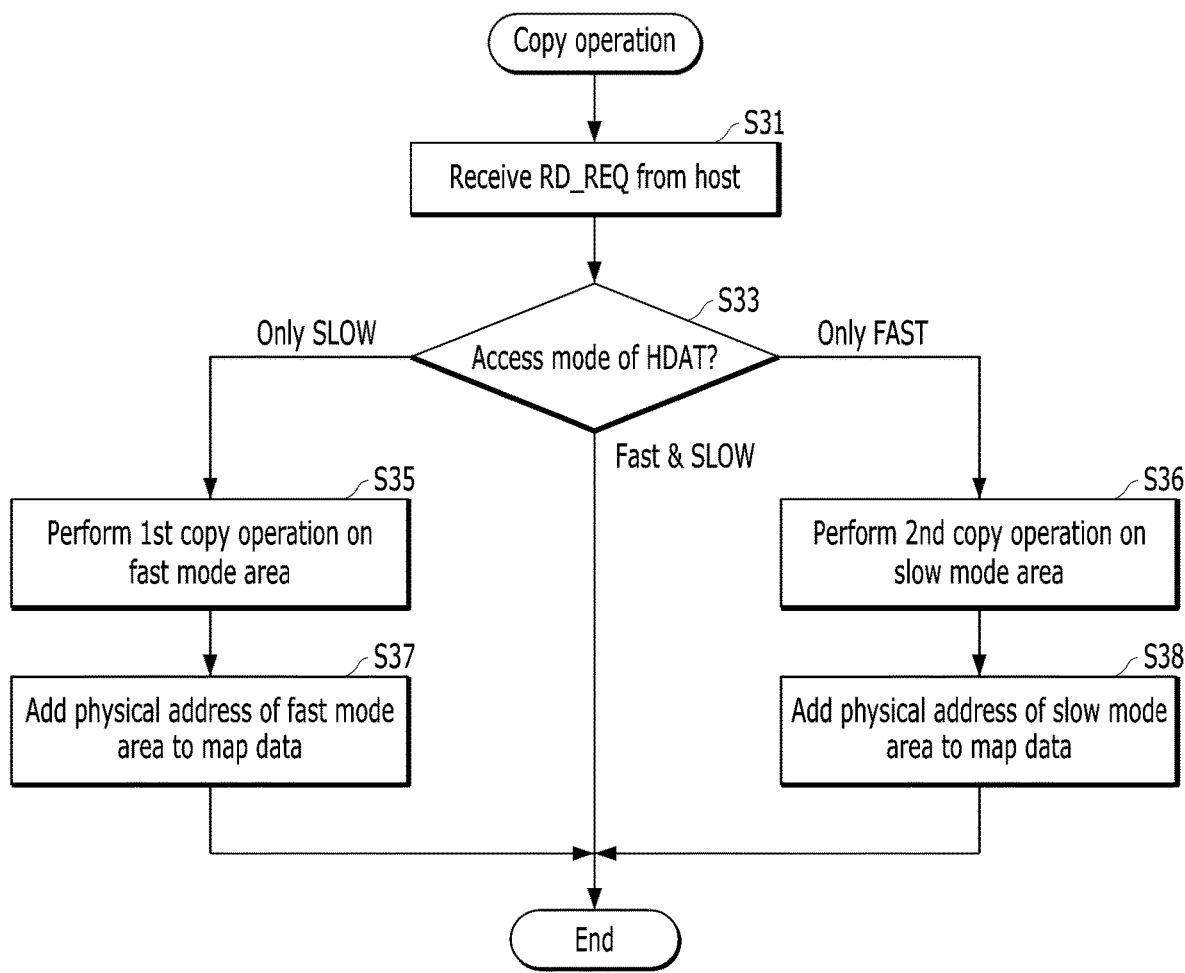

FIG. 10A is a flowchart of a method in which the memory system in accordance with the present embodiment performs the first and second copy operations for hot data based on the state value of the read count, after performing a read operation. FIG. 10B illustrates the map data and the read count in accordance with an embodiment of the present invention. Hereafter, the first and second copy operations, which are performed on hot data based on the state value of a read count for a logical address, will be described with reference to FIGS. 3, 10A and 10B.

Referring to FIG. 10A, the controller 130 updates a read count RD_CNT after performing a read operation, in step S31. The read operation may include a read operation which is performed on data stored in the memory device 150 according to the read request RD_REQ received from the host 102.

When data corresponding to the updated read count RD_CNT is hot data, the controller 130 determines the access mode of the area in which the hot data is stored, in step S33. The controller 130 may determine whether the data corresponding to the updated read count RD_CNT is hot data or cold data, based on a preset reference value and the read count RD_CNT corresponding to the logical address. Based on L2P map data including a physical address corresponding to the logical address, the controller 130 may determine whether the data corresponding to the updated read count RD_CNT is stored in the slow mode area or the fast mode area.

When the data corresponding to the updated read count RD_CNT is hot data stored only in the slow mode area ("Only SLOW" in S33), the controller 130 copies the hot data stored in the slow mode area into the fast mode area through the first copy operation in step S35. Then, the controller 130 may update the physical address of the fast mode area, on which the first copy operation was performed, into the map data in step S37. At this time, an error correction operation is not performed on the hot data which is copied into the fast mode area through the first copy operation.

When the data corresponding to the updated read count RD_CNT is hot data stored only in the fast mode area ("Only FAST" in S33), the controller 130 copies the hot data, stored only in the fast mode area, into the slow mode area through the first copy operation in step S36. Then, the controller 130 may update the physical address of the slow mode area, on which the copy operation was performed, into the map data in step S38. At this time, an error correction operation may be performed on the hot data which is copied into the slow mode area through the second copy operation.

Through the first copy operation of steps S35 and S37 and the second copy operation of steps S36 and S38, the hot data may be stored in both of the slow mode area and the fast mode area, and the map data corresponding to the logical address of the hot data may include both of the physical address of the slow mode area and the physical address of the fast mode area. This state may be maintained until the hot data are invalidated.

When the determination result of step S33 indicates that the data corresponding to the updated read count RD_CNT is stored in both of the fast mode area and the slow mode area, the controller 130 does not perform the first and second copy operations.

Hereafter, the first and second copy operations for hot data when the reference value REF for determining whether data is hot data, is set to 5 will be described in more detail with reference to FIG. 10B.

Referring to STEP A of FIG. 10B, when a read request for a logical address LBA3 is received from the host 102, the controller 130 may perform a read operation on data stored in a physical address PBA13 corresponding to the logical address LBA3, and then update the read count RD_CNT of the logical address LBA3. At this time, the controller 130 may update the read count RD_CNT of the logical address LBA3 from 4 to 5.

The moment that the read count RD_CNT of the logical address LBA3 is updated from 4 to 5, the controller 130 may determine that the data corresponding to the logical address LBA3 has become hot data, because the read count RD_CNT of 5 is equal to or more than the reference value REF of 5.

Thus, as illustrated in STEP B of FIG. 10B, the controller 130 may copy the hot data, which corresponds to the logical address LBA3 and is stored in the physical address PBA13 of the fast mode area, into the slow mode area of a physical address PBA56 through the second copy operation, in step S36. The controller 130 may update the physical address PBA56 of the slow mode area, on which the second copy operation has been performed, into the map data of the logical address LBA3 in step S38. Thus, the map data of the logical address LBA3 may include both of the physical address PBA13 of the fast mode area and the physical address PBA56 of the slow mode area.

When a read request for a logical address LBA4 is received from the host 102, the controller 130 may perform a read operation on data stored in a physical address PBA74 corresponding to the logical address LBA4, and then update the read count RD_CNT of the logical address LBA4. At this time, the controller 130 may update the read count RD_CNT of the logical address LBA4 from 4 to 5.

The moment that the read count RD_CNT of the logical address LBA4 is updated from 4 to 5, the controller 130 may determine that the data corresponding to the logical address LBA4 has become hot data, because the read count RD_CNT of 5 is equal to or more than the reference value of 5.

Thus, as illustrated in STEP B of FIG. 10B, the controller 130 may copy the hot data, which corresponds to the logical address LBA4 and is stored in the physical address PBA74 of the slow mode area, into the fast mode area of the physical address PBA17 through the first copy operation, in step S35. Then, the controller 130 may update the physical address PBA17 of the fast mode area, on which the first copy operation was performed, into the map data of the logical address LBA4 in step S38. Thus, the map data of the logical address LBA4 may include both of the physical address PBA17 of the fast mode area and the physical address PBA74 of the slow mode area. Thereafter, as illustrated in STEP C of FIG. 10B, when a read request for a logical address LBA4 is received from the host 102 again, the controller 130 may perform a read operation on data stored in a physical address PBA17 corresponding to the fast mode area, among the physical address PBA17 corresponding to the fast mode area and the physical address PBA74 corresponding to the slow mode area.

That is, when a read operation is performed, the memory system 110 in accordance with the present embodiment may output the data F_HDAT from the fast mode area where the read operation speed is higher than in the slow mode area, according to a read request, thereby reducing the time required for the read operation. Furthermore, the memory system 110 in accordance with the present embodiment can distribute read operations, which can be mainly performed only in the slow mode area, to the fast mode area, thereby preventing degradation in a characteristic of the memory cells, included in the slow mode area, by the read operations. As such, the memory system 110 in accordance with an embodiment of the present invention may perform error correction on the data stored in the slow mode area, when an error of the data stored in the fast mode area is out of the correction range, thereby avoiding a situation in which error correction for read data to be transmitted to the host 102 is unsuccessful. Thus, the reliability of the read data can be increased. At this time, the data stored in the fast area may be the same as the data stored in the slow area.

Although various embodiments have been described for illustrative purposes, it will be apparent to those skilled in the art that various changes and modifications may be made without departing from the spirit and scope of the invention as defined in the following claims.

What is claimed is:

1. An operation method of a memory system, comprising:
    determining an access mode of an area in which data corresponding to a logical address is stored, when a read request with the logical address is received from a host;
    performing an error correction operation to data from a first area when the data is stored in the first area having a first access mode and a second area having a second access mode; and
    determining whether an error of the data from the first area is successfully corrected and transmitting the error-corrected data to the host when the error of the data from the first area is successfully corrected,
    performing an error correction operation to data from the second area when the error of the data from the first area is not successfully corrected; and
    transmitting the error-corrected data from the second area to the host.

2. The operation method of claim 1, wherein the speed of a read operation and a program operation of the data stored in the first area is higher than the speed of a read operation and a program operation of the data stored in the second area.

3. The operation method of claim 1, wherein a number of state values of data which is storable in a memory cell included in the first area is less than a number of state values of data which is storable in a memory cell included in the second area.

4. The operation method of claim 1,
    wherein when the first access mode is a Single-Level Cell (SLC) mode, the second access mode comprises any one of a Multi-Level Cell (MLC) mode, a Triple-Level Cell (TLC) mode and a Quadruple-Level Cell (QLC) mode,
    wherein the first access mode is an MLC mode, the second access mode comprises any one mode of the TLC mode and the QLC mode, or
    when the first access mode is the TLC mode, the second access mode comprises the QLC mode.

5. An operation method of a memory system, comprising:
    determining an access mode of an area in which data corresponding to a logical address is stored, when a read request with the logical address is received from a host;
    performing an error correction operation to data from a first area when the data is stored in the first area having a first access mode and a second area having a second access mode; and
    determining whether an error of the data from the first area is successfully corrected and transmitting the error-corrected data to the host when the error of the data from the first area is successfully corrected,
    determining a storage area of hot data, before the read request is received; and
    copying the hot data, stored in the second area, into the first area through a first copy operation when the hot data is stored only in the second area.

6. The operation method of claim 5, further comprising copying the hot data, stored in the first area, into the second area through a second copy operation when the hot data is stored only in the first area.

7. The operation method of claim 5, wherein the first copy operation comprises:
   reading out the hot data stored in the second area, and storing the read data in a page buffer; and
   programming the hot data stored in the page buffer to the first area.

8. The operation method of claim 6, wherein the second copy operation comprises:
   reading out the hot data stored in the first area, and storing the read data in a page buffer;
   performing an error correction operation on the hot data stored in the page buffer; and
   programming the hot data, on which the error correction operation has been performed, to the second area.

9. The operation method of claim 6, wherein a background operation performed on the second area comprises a second copy operation of copying valid data stored in the second area into another memory block having the second access mode.

10. The operation method of claim 5, wherein a background operation performed on the first area comprises a first copy operation of copying valid data stored in the first area into another memory block having the first access mode.

\* \* \* \* \*